Dec. 22, 1964   H. F. BROSE   3,162,451
INVERSE LABYRINTH LIQUID SEAL
Filed Jan. 7, 1963
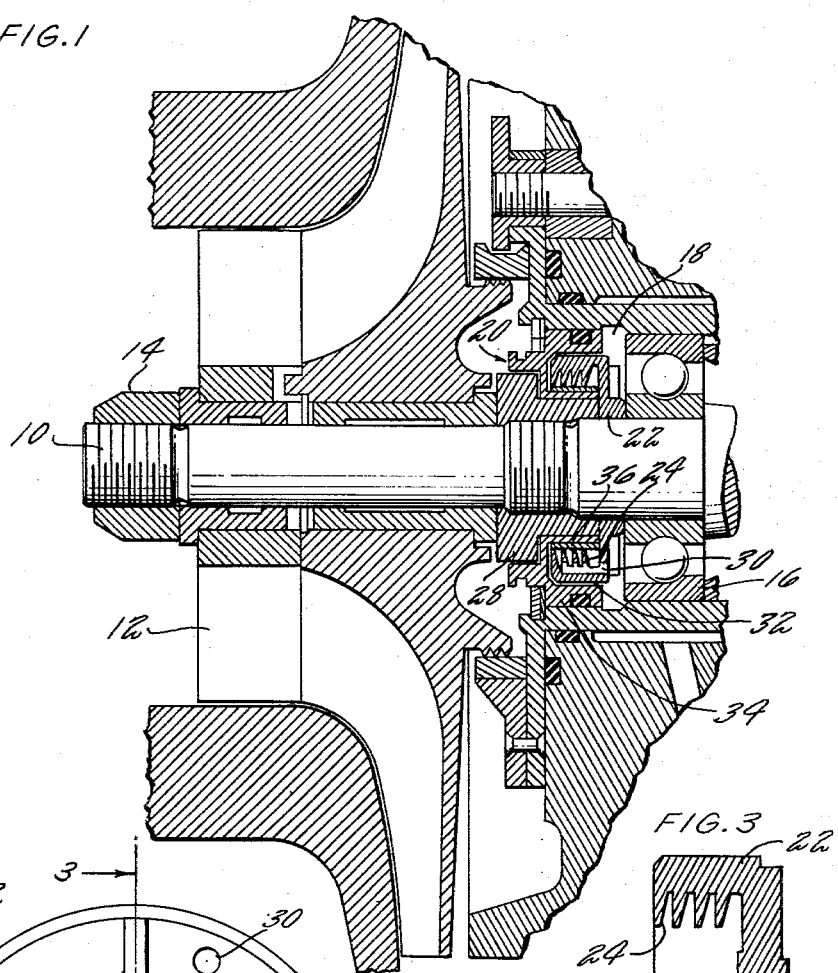
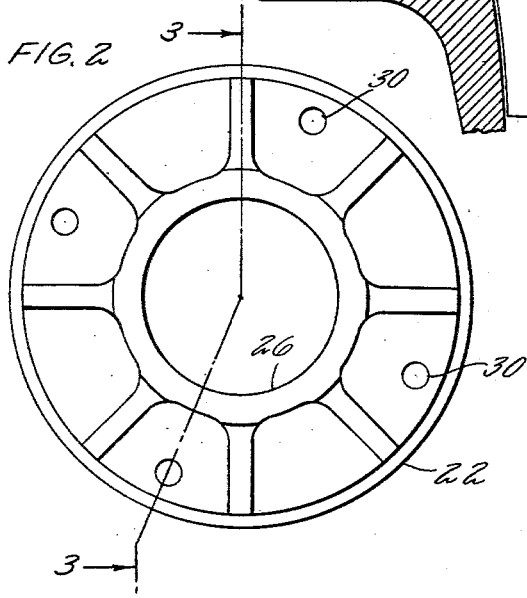
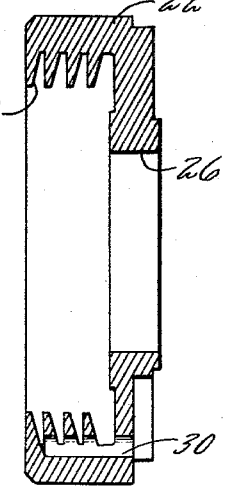
INVENTOR
HARLAN F. BROSE
BY Norman Friedland
AGENT 3,162,451
INVERSE LABYRINTH LIQUID SEAL
Harlan F. Brose, Longmeadow, Mass., assignor to United Aircraft Corporation, East Hartford, Conn., a corporation of Delaware
Filed Jan. 7, 1963, Ser. No. 249,868
3 Claims. (Cl. 277—53)

This invention relates to seals for rotating machinery and more particularly to seals of the labyrinth type.

As is well known in the art, labyrinth seals generally comprise a hard annular ring member which carries teeth rotatably engageable with a soft ring member. It is customary to either mount one or the other member to a rotating device while the other member is held stationary. It is the general practice when the member containing the labyrinth teeth is rotatably mounted, the teeth are disposed so that they face away from the axis of rotation. In this arrangement it is also customary to mount the cooperating ring to surround the teeth.

The type of labyrinth seal described above is not suitable where it is necessary to restrain liquid in a confined chamber and yet allow air to pass therethrough. Particularly in aircraft applications which subject the units to be sealed to a varying pressure by virtue of the changes in altitude during flight, it is desirable to permit the seal to breathe air to minimize the differential pressure thereacross, while completely sealing the oil within the confined chamber. Seals, such as the well-known felt type, serve as a good seal when the differential pressure thereacross is held to a minimum and when there is not excessive oil in the vicinity of the seal. But when the differential pressure increases due to a change in altitude, the effectiveness of this seal deteriorates.

I have found that by inverting the teeth of the labyrinth seal I can obviate the problems mentioned above so that the seal is able to allow a small air flow through it in either direction without losing oil. This is accomplished by forming the teeth of the labyrinth so that when it is rotatably mounted, the teeth face the axis of rotation and the teeth surround the stator, which is a soft metal ring made of a suitable soft material such as lead. By this arrangement, any particle of oil trying to escape through the seal will touch the rotor tooth which puts the oil particle in a high centrifugal field created by the rotation of the teeth and the oil runs to the root of the tooth where it is drained back through drain holes formed therein. If the oil is suspended, as in an air-oil mist, the air being placed in the centrifugal field will cause the particle to be centrifuged and collected as described above; and in a gravity environment, as the oil particle gets under the rotor teeth, gravity will force it down toward the bottom of the ring seal member where it will be forced to the root of the tooth and drained, as described above.

As mentioned above, rotating machinery which contained the usual felt-type seal was unable to breathe air, owing to changing altitude, without the seal presenting intolerable leaking problems. The felt seal also leaks at steady state altitude conditions when it must retain an excessive amount of oil. The same machinery with the improved labyrinth seal replacing the felt seal provided the important advantage of being able to breathe air in the changing altitude and tests conducted to date show that the heretofore leakage problems were entirely eliminated.

While the invention is described in connection with sealing oil contained in a bearing chamber of turbo machinery, it is to be understood that the invention is not limited thereto and as anyone skilled in the art will appreciate, such a seal arrangement may be used to seal any liquid contained in a chamber for any type of rotating machinery.

An object of this invention is to invert the labyrinth teeth of a labyrinth-type seal so that the teeth face the axis of rotation, and wherein the teeth are mounted to rotate with respect to the stator ring-like member.

Another object of this invention is to provide a seal that permits the breathing of air and prevents the escape of liquid from a confined chamber.

Another object of this invention is to provide a labyrinth seal which is characterized as affording better sealing characteristics, is simpler and is easier to assemble than the well-known felt seals.

Other features and advantages will be apparent from the specification and claims and from the accompanying drawings which illustrate an embodiment of the invention.

teeth.

FIG. 1 is a partial sectional view of turbo machinery utilizing my invention.

FIG. 2 is an elevated view of the inverse labyrinth

FIG. 3 is a section taken along line 3—3 of FIG. 2.

Referring now to FIGS. 1–3, which show a portion of the rotating machinery having a shaft 10 which supports rotor 12. The rotor may be secured to the shaft by nut 14. This shaft is rotatably supported to the housing by suitable ball bearings 16, which are disposed in an oil receiving chamber 18. Oil is directed to this chamber in any suitable manner. Also disposed in this chamber is labyrinth seal generally indicated by numeral 20 which serves to prevent oil from seeping toward the rotor. The labyrinth seal comprises an annular member 22 made from a suitable hard metallic substance which has formed on its inner diameter a plurality of teeth 24 which extend radially toward the axis line of rotation. A central bore 26 is formed in member 22 for fitting over the shaft 10. Clamping member 28 also slides over the shaft for clamping member 22 to the shaft so that it will rotate therewith. A plurality of drill passages 30 are formed in the member 22 and intersect at the base or the root of the teeth. Member 22 is located adjacent the seal retaining member 34 so that teeth 24 fit into annular groove 32 formed therein. Seal retaining member 34 serves to hold the seal member 36 which is a soft metal ring which may be made from some suitable soft material such as lead. Teeth 24 are rotatably engageable with seal ring 36. In order to obtain a close fit between the two members, the ring may be under-sized and the teeth may be broach fitted over this ring giving a line-on-line fit.

In operation, rotation of shaft 20 will cause rotation of the labyrinth teeth which in turn creates a centrifugal field of the air located in close proximity to the teeth. Oil attempting to seep out of the fluid chamber 18 will atempt to flow between the outside diameter of labyrinth member 22 and an adjacent inner wall of annular chamber 32 formed in the seal retainer 34 and continues to flow radially toward the labyrinth teeth. Here the oil particle presumably will contact one of the teeth and upon touching directs the oil particle in the high centrifugal field forcing that particle to the root of the tooth where it is in turn directed through one of the drilled passages 30. If the particle of oil is suspended as in an air-oil mist and attempts to come through the labyrinth teeth or back through the drain holes, which may be occasioned by a change of altitude, the particle will be centrifuged owing to the spinning motion of the air in the labyrinth rotor and forced back through the drain holes and back to chamber 18. Particles of oil which manage to get under the rotor teeth will tend to flow to the bottom of ring member 36 due to the force of gravity where it will drip off and virtually be picked up by the teeth at the lower portion of the labyrinth teeth 24 where it again will be driven toward the root of the tooth and ino the drain passages by the centrifugal force.

In applications where it is desirable to not only provide a positive seal against the leakage of liquid, but also to seal against air, it is contemplated by this invention to utilize the inverse labyrinth seal in conjunction with the usual type of labryinth seal. In such an application, the inverse labyrinth seal will be adjacent to or in close proximity with the customary labyrinth seal so that the liquid will be separated and restrained by the inverse labyrinth seal and the air flow will be restricted by the customary labyrinth seal.

Such a dual seal system is particularly suitable where the unit intended to be sealed has a tendency to flow into one seal located on one end of the chamber intended to be sealed and out of another seal placed on the other end of said chamber. Of course it is to be understood that a rotating shaft passes through the chamber and the seals tend to prevent leakage at the points where the shaft passes therethrough. When there is a continuous air flow, the lubrication of the bearings may be disturbed as well as carrying foreign matter, such as dirt and contamination, into the unit.

By virtue of this invention the centrifugal field developed by the rotating member is utilized to drive the escaping liquid toward the root of the tooth to eventually drain through drilled holes formed at the base of the teeth. This permits the seal to breathe air and yet provides a positive seal for preventing the escaping liquid. This differs materially from the heretofore known labyrinth seals which, by virtue of their design, afford no means for inducing oil trapped in the stator soft material member to be caught in the centrifugal field created by the rotor member of the seal.

It is to be understood that the invention is not limited to the specific embodiment herein illustrated and described, but may be used in other ways without departing from its spirit.

I claim:

1. A labyrinth fluid seal for a chamber receiving lubricant comprising, in combination, a body having an annular flange, serrations formed on the inner diameter of said annular flange, a stationary ring member in juxtaposition to said flange and having a surface formed from a soft metallic substance engaging said serrations, means for imparting rotary motion to said body, and passages in the body terminating adjacent to the serrations communicating with the chamber for receiving lubricant directed thereto by the rotating serrations and returning the lubricant back to the chamber.

2. Apparatus for sealing liquid in a chamber adjacent to rotating shaft comprising a body having an annular member, a ring mounted within the annular member and having an annular surface underlying the inner surface of the annular member, teeth formed on the inner diameter of the annular member, and having their apex in rotatable engagement with the said annular surface, means for imparting rotary motion to the teeth and passage means formed in the body terminating at the roots or base of said teeth communicating with said chamber.

3. Apparatus for sealing liquid within a chamber formed adjacent a rotating shaft comprising, in combination, a rotor mounted on said shaft or rotating therewith, said rotor carrying an anuular flange member, teeth formed on the inner diameter of said annular member and projecting inwardly toward the axis of rotation, a stationary seal ring member made from a soft material mounted about said shaft and having a surface engaging the ends of said teeth, passages formed in said rotor member extending through the base of said teeth and communicating with said chamber, said teeth when rotating creating a centrifugal field of the air in proximity to said teeth for forcing liquid adjacent said teeth to drain through said passages.

References Cited by the Examiner
UNITED STATES PATENTS 887,831 5/08 Muth _____ 308—36.4 X
3,004,782 10/61 Meermans _____ 277—67 X

FOREIGN PATENTS 1,227,575 3/60 France.
231,471 10/25 Great Britain.

EDWARD V. BENHAM, *Primary Examiner.*

SAMUEL ROTHBERG, *Examiner.*